(12) United States Patent
Berglar

(10) Patent No.: US 6,412,364 B1
(45) Date of Patent: Jul. 2, 2002

(54) ACCELERATOR PEDAL SENSOR/SENDER

(75) Inventor: Heinrich Berglar, Lippetal (DE)

(73) Assignee: Hella KG Hueck & Co., Lippstadt (DE)

( * ) Notice: Subject to any disclaimer, the term of this patent is extended or adjusted under 35 U.S.C. 154(b) by 0 days.

(21) Appl. No.: 09/578,695

(22) Filed: May 26, 2000

(30) Foreign Application Priority Data

May 27, 1999 (DE) .......................................... 199 24 410

(51) Int. Cl.⁷ ................................................. G05G 1/14
(52) U.S. Cl. ...................................................... 74/514
(58) Field of Search .......................... 74/514, 513, 560, 74/512

(56) References Cited

U.S. PATENT DOCUMENTS

| | | | |
|---|---|---|---|
| 4,528,590 A | * 7/1985 | Bisacquino et al. | ...... 74/513 X |
| 5,237,891 A | * 8/1993 | Lundberg et al. | ........ 200/61.89 |
| 5,295,409 A | * 3/1994 | Byram et al. | ................ 123/399 |
| 5,385,068 A | * 1/1995 | White et al. | .............. 74/513 X |
| 5,408,899 A | * 4/1995 | Stewart | ..................... 74/514 X |
| 5,575,181 A | * 11/1996 | Baumann | .................. 74/560 X |
| 5,697,260 A | * 12/1997 | Rixon et al. | .................. 74/514 |
| 5,768,946 A | * 6/1998 | Fromer et al. | ................. 74/514 |
| 5,819,593 A | * 10/1998 | Rixon et al. | .................. 74/513 |
| 6,089,120 A | * 7/2000 | Lochle et al. | ................. 74/514 |

FOREIGN PATENT DOCUMENTS

| | | |
|---|---|---|
| DE | C1-4407005 | 3/1995 |
| DE | C1-19521821 | 12/1996 |
| DE | C1-19544997 | 1/1997 |

* cited by examiner

Primary Examiner—Chong H. Kim
(74) Attorney, Agent, or Firm—Birch, Stewart, Kolasch & Birch

(57) ABSTRACT

An accelerator pedal sensor/sender has a housing, a pedal lever connected at a first end portion with a pedal plate and supported at an opposite second end portion in the housing, and an electrical rotation sensor comprising a sensor plate and an actuating element that is driven by the pedal lever. The pedal lever is formed as a single piece of plastic material, including two perpendicular pins, to form a first connecting element that is directly connected with a second connecting element of an actuating element.

8 Claims, 2 Drawing Sheets

ACCELERATOR PEDAL SENSOR/SENDER

BACKGROUND OF THE INVENTION

This application claims a foreign priority based on German application 199 24 410.3, filed on May 27, 1999, and the contents of that priority German application are incorporated herein by reference.

This invention relates to a driving pedal sensor/sender having a housing, a pedal lever with a first end portion for being connected to a pedal plate and a second end portion being supported in the housing, and an electrical rotation sensor including a sensor plate and an actuating element driven by the pedal lever. The sensor/sender senses movement of the pedal lever, and in response thereto sends out a signal. Such elements are sometimes referred to only as sensors, and this terminology will also sometimes be used below.

A driving, such as accelerator, pedal sensor/sender of this type is disclosed by FIG. 2 or FIG. 3 of German patent document (DE 44 070 05 C1) (main patent) taken together with FIG. 1 of German patent document (DE 195 21 821 C1) (related supplementary patent). In the known accelerator pedal sensor/sender, the pedal lever and the actuating element are connected by a metal actuating shaft.

An object of this invention is to provide an accelerator pedal sensor/sender that is less complicated and less expensive in construction than are accelerator pedal sensors/senders of the prior art.

SUMMARY OF THE INVENTION

According to principles of the invention a pedal lever is a single resinous plastic part which forms a first connecting element that is directly connected with a second connecting element of an actuating element.

Because of the inventive structure of the accelerator pedal sensor/sender of this invention, a metal linking shaft between the pedal lever and the actuating element can be eliminated.

It is especially advantageous to structure the accelerator pedal sensor/sender to have the particular characteristics described herein. In this manner, a shaft for the pedal lever can be entirely omitted, since the pedal lever itself is supported within the housing.

BRIEF DESCRIPTION OF THE DRAWINGS

The invention is described and explained in more detail below using an embodiment shown in the drawing. The described and drawn features can be used individually or in preferred combinations in other embodiments of the invention. The foregoing and other objects, features and advantages of the invention will be apparent from the following more particular description of a preferred embodiment of the invention, as illustrated in the accompanying drawing. The drawing is not necessarily to scale, emphasis instead being placed upon illustrating principles of the invention in a clear manner.

DESCRIPTION OF THE PREFERRED EMBODIMENT

Figure 1:
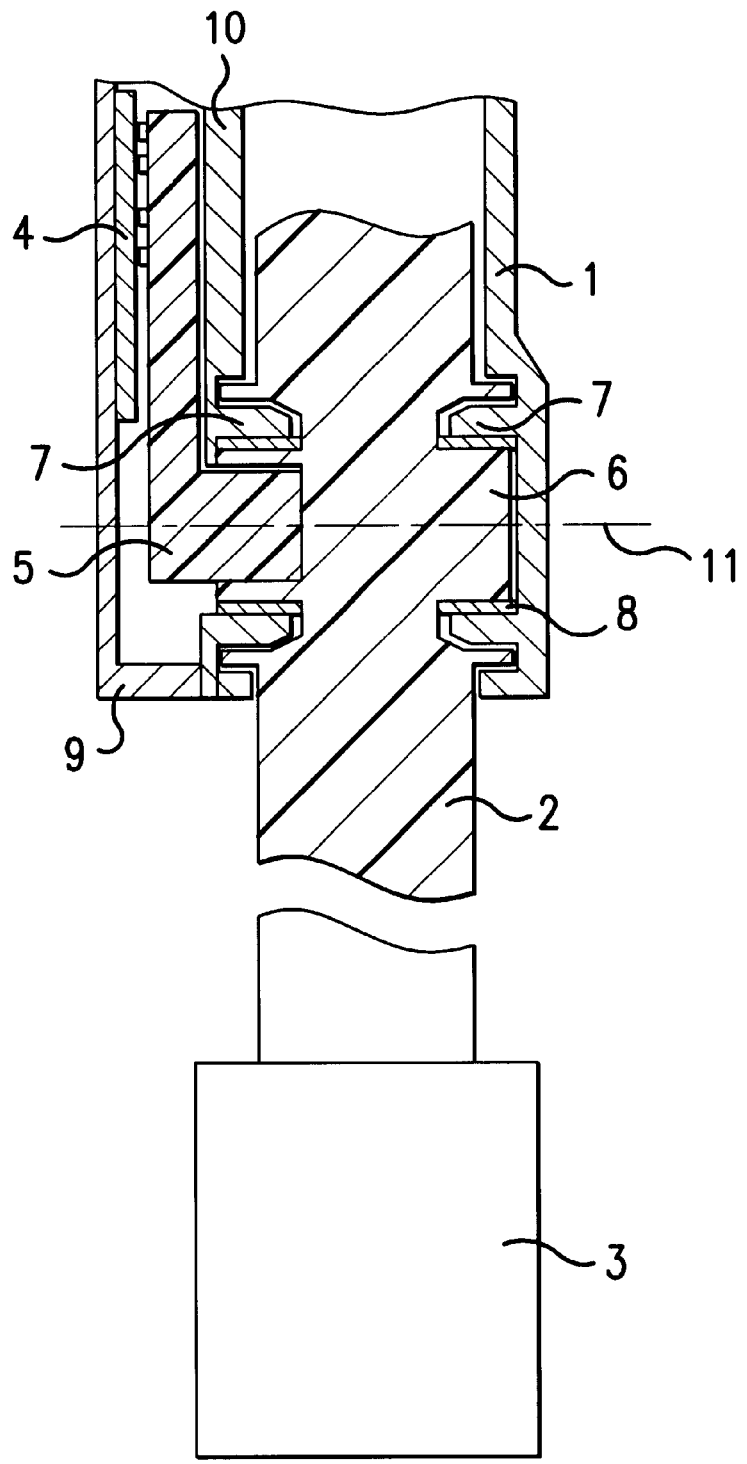
FIG. 1 is a cross sectional view of an accelerator pedal sensor/sender of this invention with a pedal plate.

A pedal lever 2 having a pedal plate 3 at a first end portion is supported within a housing 1, 10 of an accelerator pedal sensor/sender. The housing comprises a housing part 1 and a housing cover 10. The pedal lever 2 has two pins 6 formed as perpendiculars to its longitudinal axis which pins are supported in a manner permitting rotary motion, in bushings 7 respectively formed in the housing part 1 and in the housing cover 10. To this end, bearing shells 8 made of a bearing-suitable material, for example, PP or POM, are formed on the pins 6 using a two component process.

Alternately, the entire pedal lever 2, including the integrally molded-on pins 6, can be manufactured from a bearing-suitable material, so that the forming of bearing shells onto the pins can be omitted, The pins 6 on the pedal lever thus form a rotation shaft of the pedal lever 2.

Figure 2:
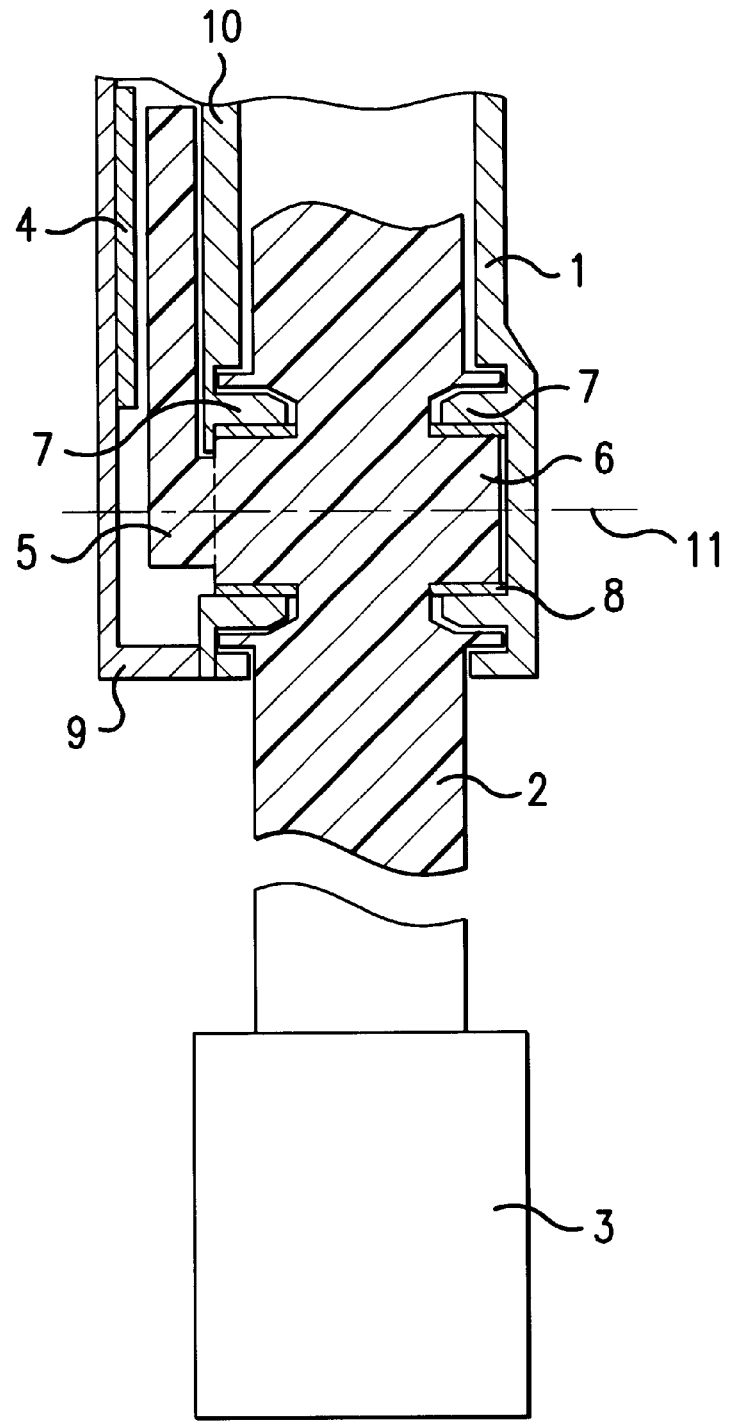
FIG. 2 is a view similar to FIG. 1, but of an alternate embodiment.

Through open sides of the bushing within the housing covering 10, the pin 6 of the accelerator pedal sensor/sender is locked with an actuating element 5 of a rotation sensor, which is structured as a potentiometer in the drawing but which may also be constructed as a contactless sensor, so that the actuating element 5 (in FIG. 1 a contact-brush support of the potentiometer and in FIG. 2 a contactless element of a sensor) and the pedal lever rotate around the same axis of rotation 11.

The connection between the pin of the pedal lever 2 and the actuating element 5 can advantageously be made by the connecting element disclosed in German patent document (DE 195 44 997 C1) (not visible in the drawing).

A rotation sensor connected with the housing 1, 10 is enclosed by a sensor cover 9 that supports a sensor plate 4 of the potentiometer.

The accelerator pedal sensor/sender according to the invention is different from known such devices in that it omits a metal shaft that connects the pedal lever with the actuating element of the rotation sensor. This is achieved in that the pedal lever is made of a plastic and, as a single piece, forms a first connecting element that is directly connected with a second connecting element which is an actuating element. In this regard, the actuating element of the contactless sensor can be applied or stamped directly on a face of the pin 6.

The invention claimed is:

1. A driving pedal sensor comprising:

a housing (1, 10), a pedal lever (2) for being connected at a first end portion with a pedal plate (3) and being supported at a second, opposite, end portion in the housing (1, 10), an electrical rotation sensor coupled to said pedal lever, said electrical rotation sensor comprising a sensor plate (4) and an actuating element (5) that is driven by the pedal lever (2), wherein the pedal lever (2) is formed as a single part of resinous plastic which is connected directly with the actuating element (5), wherein the pedal lever (2) has first and second pins (6) formed thereon, as a single piece therewith, perpendicular to an axis of elongation of the pedal lever, the pins being respectively supported in first and second bushings (7) of the housing (1, 10), wherein said first pin is coupled to said actuating element, said first pin and the actuating element forming a unit extending through said first bushing with said actuating element abutting an axially-directed face of the first pin and coupled thereat to be at least partially located beyond said bushing for interacting with said sensor plate, wherein the actuating element and the at least first pin have the same axis of rotation (11).

2. The driving pedal sensor as in claim 1, wherein bearing shells (8) are injection-molded onto the pins (6) for bearing on the bushings.

3. The driving pedal sensor as in claim 1, wherein the pins (6) are made of a plastic material suitable as a bearing.

4. The driving pedal sensor as in claim 1, wherein the rotation sensor is a potentiometer and the actuating element (5) is a contact-brush support of the potentiometer.

5. The driving pedal sensor as in claim 1, wherein the rotation sensor is constructed as a contactless sensor.

6. The driving pedal sensor as in claim 5, wherein the actuating element of the contactless sensor is stamped directly onto an said axially-directed facing face of the first pin.

7. The driving pedal sensor of claim 1, wherein the actuating element is stamped directly on the axially-directed face.

8. The driving pedal sensor of claim 1, wherein the axially directed face has an indentation and the actuating element is a single-piece solid member positioned in said indentation to be thereby locked with said first pin.

* * * * *